UNITED STATES PATENT OFFICE.

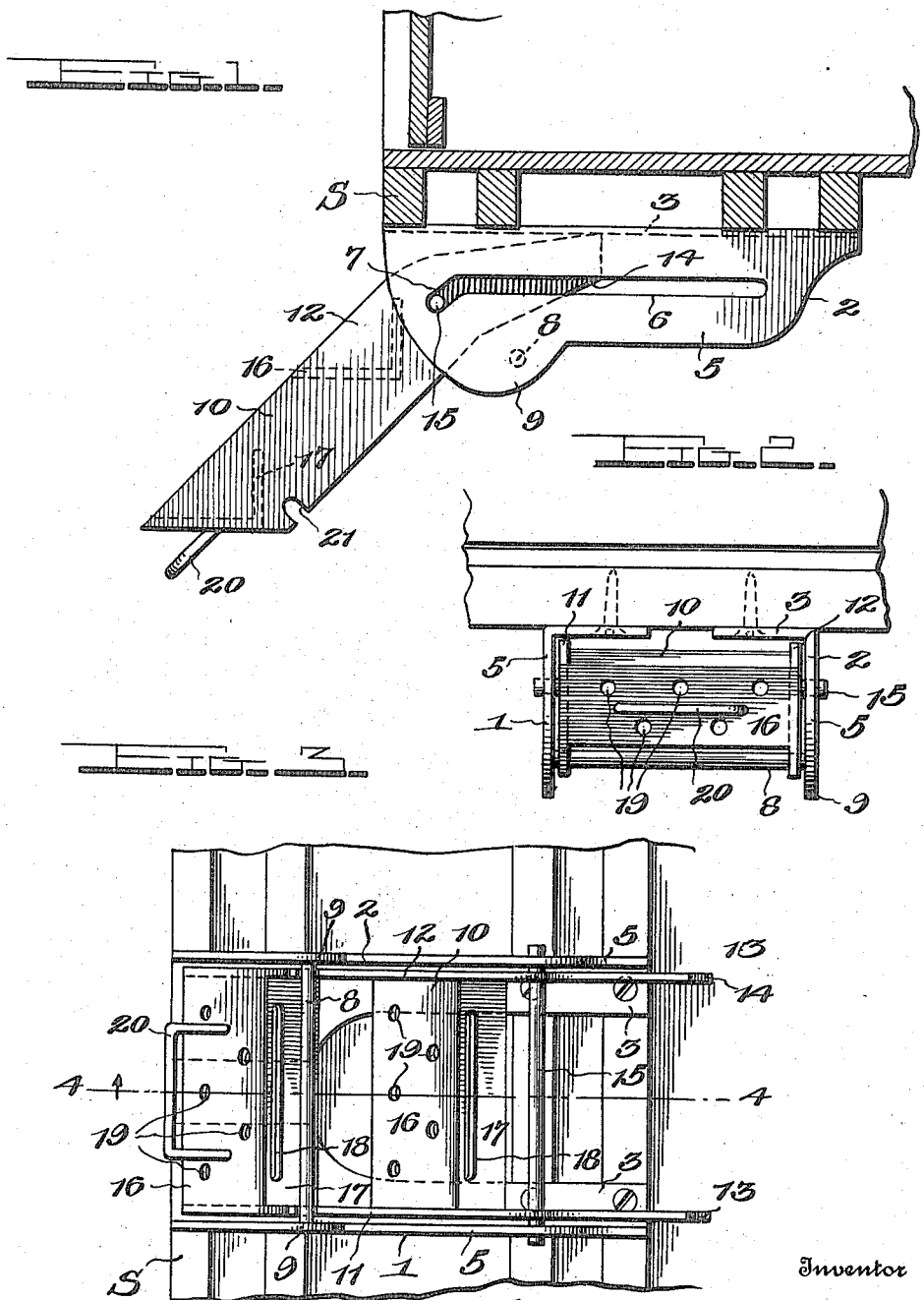

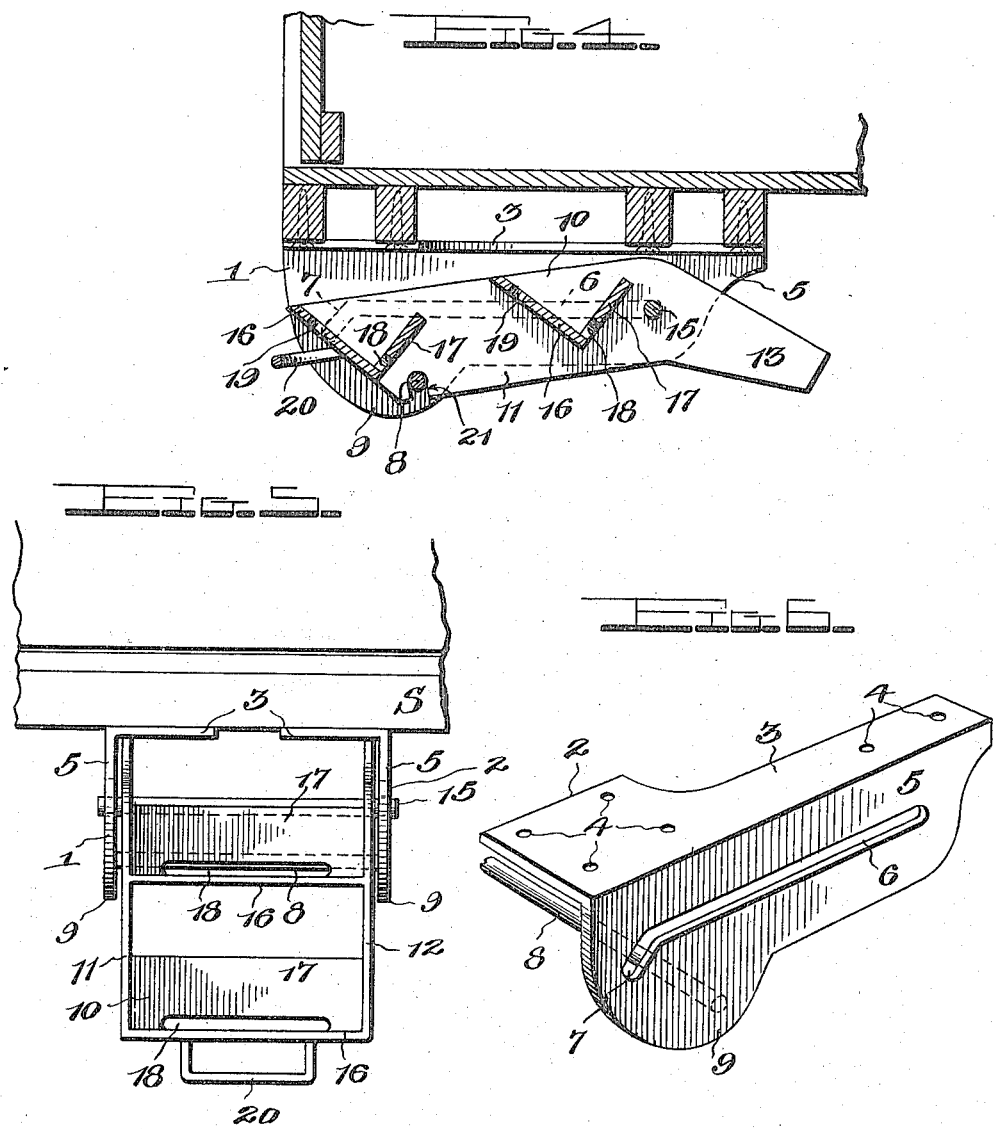

FRANK W. CHICKERING, OF HARDWICK, VERMONT, ASSIGNOR OF ONE-HALF TO JOHN J. GALLAGHER, OF HARDWICK, VERMONT.

EXTENSION CAR-STEP.

1,148,356.   Specification of Letters Patent.   Patented July 27, 1915.

Application filed December 28, 1914. Serial No. 879,380.

*To all whom it may concern:*

Be it known that I, FRANK W. CHICKERING, a citizen of the United States, residing at Hardwick, in the county of Caledonia and State of Vermont, have invented certain new and useful Improvements in Extension Car-Steps; and I do declare the following to be a full, clear, and exact description of the invention, such as will enable others skilled in the art to which it appertains to make and use the same.

This invention relates to improvements in extension steps which are more particularly adapted for use on freight cars.

The object of the invention is to provide a simply constructed and efficient extension step or series of steps which may be quickly and easily lowered and locked in operative position, and readily swung upward and slid backward into retracted inoperative position and locked out of the way by an upward tilting and backward sliding movement.

Another object is to provide sliding extension steps with means for automatically locking them when slid forward and swung downwardly into operative position, and also automatic means for locking them in retracted inoperative position.

Another object is to provide steps of this character which when drawn forward a predetermined distance will drop down by gravity into operative position and be automatically locked in said position.

The steps constituting this invention may be applied equally well to a freight car, motor truck, farm wagon, or any object or support where an extension step is needed to provide means for conveniently entering or leaving a vehicle or the support to which it is attached; or it may be used as an extension step for application to the ordinary car steps and frame now in common use on railway cars, whereby an auxiliary step or steps having the same appearance and dimensions as the stationary steps may be quickly extended and lowered by an attendant when the car stops, and as quickly raised out of the way and locked prior to the starting of the car.

With these and other objects in view, the invention consists of certain novel features of construction, and the combination and arrangement of parts as will be more fully described and claimed.

In the accompanying drawings, Figure 1 represents a side elevation of this improved extension step shown in extended operative position and applied to a freight car a fragment of which is shown in section; Fig. 2 is an end elevation of this attachment with the step in retracted inoperative position; Fig. 3 is a bottom plan view thereof with the step retracted; Fig. 4 is a longitudinal central section taken on the line 4—4 of Fig. 3; Fig. 5 is an end view showing the step in lowered position, and Fig. 6 is a detail perspective view of one of the attaching brackets with a portion of the connecting rod shown applied.

The attachment constituting this invention comprises combined attaching brackets and guides 1 and 2 with a series of movable steps slidably mounted therein, it being obvious that a single step may be used instead of the series herein shown.

The brackets 1 and 2 are similarly constructed and hence one only will be described in detail. Each of these brackets is made in the form shown in Fig. 6 with an attaching plate 3 provided with apertures 4 for the passage therethrough of the securing screws or bolts, said plate being here shown wider at its front than at its rear end, although it may be of the same width throughout if desired.

Depending at right angles from one side edge of the plate 3 is a step supporting plate 5 which is preferably formed integral with the plate 3 and is provided with a longitudinally extending slot 6 extending throughout the greater portion of its length and arranged parallel with the straight upper edge thereof, the front end of said slot being inclined downwardly and forwardly to form a seat 7 for a purpose to be described. As shown these plates 5 each has a depending ear 9 at its front end in which is fixedly mounted a cross rod 8 which is designed to form one member of a step lock to be hereinafter described, and which also serves to connect and brace the brackets 1 and 2 at their front ends where the greater portion of the strain is borne when the steps are in use.

The movable step or steps 10 comprise the usual side pieces 11 and 12, the upper rear ends of which are prolonged to form inclined downwardly and rearwardly extending obtuse angled arms 13 and 14 here shown integral with the side pieces 11 and 12, and tapered toward their free ends to reduce their weight.

A cross rod 15 extends through the side pieces 11 and 12 at their juncture with the arms 13 and 14 and projects beyond the outer faces of said side pieces, being fixedly connected therewith and which forms a strengthening brace for the side pieces, the projecting ends of said rod being adapted to slidably engage the slots 6 in the brackets 1 and 2, and in connection with the inclined ends or seats 7 of said slots, form a lock for the steps when in lowered operative position, as is shown clearly in Fig. 1.

Two steps 16 are here shown disposed any desired or suitable distance from each other and provided with the usual risers 17 which are here shown slotted at their lower edges as at 18 to permit water to drain therefrom when in inoperative position, as otherwise the combined steps and risers would form troughs for holding water, snow and the like. The steps 16 are shown perforated as at 19 for the same purpose. A handle 20 is shown mounted on the lower face of the bottom step 16 and is designed for operating the steps.

In the use of this step the brackets 1 and 2 being secured to the sills S of a freight car or to any other support to which the step is to be attached with the rod 8 connecting and bracing them as shown, the projecting ends of the rod 15 are positioned in the slots 6 of the plates 5 of said brackets and whereby said steps are slidably engaged with said brackets to provide for their ready retraction and expansion when desired. When the steps are moved forwardly and swung downwardly into the position shown in Fig. 1, the studs formed by the projecting ends of the rod 15 will enter the seats 7 of the slots 6 and lock said steps in lowered operative position, the rear free ends of the arms 13 and 14 engaging the lower faces of the plates 3 of the brackets 1 and 2, and thereby relieving the cross rod 15 of the major portion of the weight to be borne by the steps, it being obvious that any weight placed on said steps will be borne by the plates 3 against which these arms abut. The projecting ends of the rod 15 in addition to forming locking means for the steps also form a pivotal connection of the steps with the brackets so that they may be readily swung upwardly when it is desired to retract them.

As shown the lower edges of the arms 13 and 14 are inclined and are so positioned as to engage the cross rod 8 when the steps are swung upwardly, thereby causing the ends of the cross bar 15 to ride upwardly in the seats or inclined slots 7 to position them at the outer front ends of the straight slots 6 ready for rearward movement therein, and when a slight rearward pressure is exerted on the steps, these studs formed by the projecting ends of the rod 15 will slide freely in the slots until they engage the rear ends thereof, said rear ends forming stops for limiting the inward movement of the steps.

The side pieces 11 and 12 of the steps are provided at their front ends in their lower edges with notches 21 which are so positioned that they will fit over and engage the cross rod 8 when the projecting ends of the rod 15 have reached their extreme rearward limit, and are in contact with the rear ends of the slots 6 and thus said steps will be securely locked by this engagement of the notches 21 and rod 8 in retracted inoperative position.

When it is desired to extend the steps into operative position, the handle 20 is grasped and the steps raised slightly a sufficient distance to disengage the notches 21 in the side pieces 11 and 12 from the cross rod 8, and a forward pull is then exerted on the steps, causing the ends of rod 15 to slide forwardly in the slots 6, and when they reach the front ends thereof they will automatically drop into the seats 7 and thereby securely lock the steps in lowered operative position.

By constructing these steps and their connecting brackets in the manner above described, it will be obvious that very slight exertion is necessary for raising and shifting the steps to retracted position, and that a slight pull only is necessary for moving them forward, and that when they reach the front ends of the slots 6 they will be dropped by gravity into the seats 7, formed at the front ends of these slots 6 as above described.

I claim as my invention:

1. An extension step comprising supporting brackets having longitudinally extending slots, a cross rod connecting said brackets, steps having side members provided with inclined rearwardly extending arms at their upper ends, studs extending laterally from said side members, said side members having notches formed in their lower edges positioned to engage the cross bar of said brackets when the steps are moved inwardly to their extreme limit.

2. An extension step comprising supporting brackets having longitudinally extending slots provided at their front ends with downwardly inclined communicating seats, steps having side members provided with obtuse angled rearwardly extending arms at their upper ends, lateral projections on said side members slidable in the slots of said brackets, and coöperating means on said side members and brackets for locking said steps in retracted position.

3. A slidable swinging extension step comprising horizontally disposed supporting brackets having longitudinally extending slots therein, said slots being inclined downwardly and forwardly at their front ends to form seats, side pieces having a step arranged between them, laterally projecting studs carried by said side pieces and slidable in said slots, said studs being adapted to enter said seats when the step carrying side pieces reach their extreme outward limit.

4. A slidable swinging extension step comprising horizontally disposed supporting brackets having longitudinally extending slots therein, said slots being inclined downwardly and forwardly at their front ends to form seats, side pieces having a step arranged between them, laterally projecting studs carried by said side pieces and slidable in said slots, said studs being adapted to enter said seats when the step carrying side pieces reach their extreme outward limit, lateral stops on said brackets and rearwardly extending arms on said side pieces for engaging said bracket stops to limit the downward movement of the swinging extension step member.

5. An extension step comprising supporting brackets having longitudinally extending slots provided at their front ends with downwardly inclining seats, a cross rod connecting said brackets, steps having side members provided with inclined rearwardly extending arms at their upper ends, steps disposed between said side members, studs extending laterally from said side members at the junction of said arms with said side members, said side members having notches formed in their lower front edges positioned to engage the cross bar of said brackets when the steps are moved inwardly to their extreme limit.

In testimony whereof I have hereunto set my hand in presence of two subscribing witnesses.

FRANK W. CHICKERING.

Witnesses:
 ARTHUR F. GROW,
 MELVIN G. MORSE.

Copies of this patent may be obtained for five cents each, by addressing the "Commissioner of Patents, Washington, D. C."